US012654668B2

(12) United States Patent 
Wang et al.

(10) Patent No.: US 12,654,668 B2 
(45) Date of Patent: Jun. 16, 2026

(54) AIR SUPPLY UNIT

(71) Applicant: KH Automotive Technologies Co., Ltd., Huzhou (CN)

(72) Inventors: Mian Wang, Huzhou (CN); Yasong Zhang, Huzhou (CN)

(73) Assignee: KH AUTOMOTIVE TECHNOLOGIES CO., LTD., Huzhou (CN)

( * ) Notice: Subject to any disclaimer, the term of this patent is extended or adjusted under 35 U.S.C. 154(b) by 0 days.

(21) Appl. No.: 18/834,981

(22) PCT Filed: Sep. 21, 2022

(86) PCT No.: PCT/CN2022/120305 
§ 371 (c)(1), 
(2) Date: Jul. 31, 2024

(87) PCT Pub. No.: WO2024/000847 
PCT Pub. Date: Jan. 4, 2024

(65) Prior Publication Data 
US 2025/0229212 A1 Jul. 17, 2025

(30) Foreign Application Priority Data

Jun. 30, 2022 (CN) .......................... 202210770968.7

(51) Int. Cl. 
*B60T 17/06* (2006.01) 
*B01D 46/00* (2022.01) 
(Continued)

(52) U.S. Cl. 
CPC .......... *B60T 17/06* (2013.01); *B01D 46/0036* (2013.01); *B01D 53/0446* (2013.01); 
(Continued)

(58) Field of Classification Search 
CPC ........ B60T 17/004; B60T 17/02; B60T 17/04; B60T 17/06; B01D 2259/4566; 
(Continued)

(56) References Cited

U.S. PATENT DOCUMENTS

| | | | | |
|---|---|---|---|---|
| 3,574,352 | A | * | 4/1971 | Elliott ................ B60G 17/0155 |
| | | | | 267/64.16 |
| 9,764,278 | B2 | * | 9/2017 | Bergemann ........ B01D 53/0407 |
| 2016/0090973 | A1 | | 3/2016 | Nishido |

FOREIGN PATENT DOCUMENTS

| | | |
|---|---|---|
| CN | 206738929 U | 12/2017 |
| CN | 108973580 A | 12/2018 |

(Continued)

OTHER PUBLICATIONS

Extended European search report of counterpart EP application No. 22948936.4 issued on Feb. 24, 2025.

(Continued)

*Primary Examiner* — Atif H Chaudry 
(74) *Attorney, Agent, or Firm* — The Sun IP Law

(57) ABSTRACT

The disclosure provides an air supply unit, the air supply unit provided in the disclosure includes a bearing seat, a drying mechanism, an air storage mechanism, an air supply mechanism and a control valve assembly; the air supply mechanism is connected with one end of the bearing seat, an air channel is formed in the other end of the bearing seat, and the control valve assembly is provided on one end of the bearing seat where the air channel is formed, and communicates with the air channel; and the drying mechanism is provided in the bearing seat, the air storage mechanism is sleeved on one end of the bearing seat that is provided with the air supply mechanism, and the air supply mechanism is located in the air storage mechanism.

19 Claims, 3 Drawing Sheets

(51) Int. Cl.

| | | |
|---|---|---|
| *B01D 53/04* | (2006.01) | |
| *B01D 53/26* | (2006.01) | |
| *B60G 11/27* | (2006.01) | |
| *B60G 17/015* | (2006.01) | |
| *B60G 17/052* | (2006.01) | |
| *B60T 17/00* | (2006.01) | |
| *B60T 17/02* | (2006.01) | |
| *B60T 17/04* | (2006.01) | |

(52) U.S. Cl.

CPC .......... *B01D 53/261* (2013.01); *B60T 17/004* (2013.01); *B60T 17/02* (2013.01); *B60T 17/04* (2013.01); *B01D 2257/80* (2013.01); *B01D 2259/4566* (2013.01); *B60G 11/27* (2013.01); *B60G 17/0155* (2013.01); *B60G 17/0523* (2013.01); *B60G 2204/62* (2013.01); *B60G 2500/2021* (2013.01); *B60G 2500/203* (2013.01); *B60G 2500/205* (2013.01); *B60G 2800/91* (2013.01)

(58) Field of Classification Search

CPC ................ B01D 53/0446; B01D 53/26; B60G 17/0523; B60G 17/0155; B60G 2500/203; B60G 2500/2021

See application file for complete search history.

(56) References Cited

FOREIGN PATENT DOCUMENTS

| CN | 110481260 | A | 11/2019 |
|---|---|---|---|
| CN | 210591904 | U | 5/2020 |
| CN | 111469619 | A | 7/2020 |
| CN | 112167213 | A | 1/2021 |
| CN | 112275101 | A | 1/2021 |
| CN | 212860990 | U | 4/2021 |
| CN | 215720440 | U | 2/2022 |
| CN | 114320824 | A | 4/2022 |
| CN | 216467239 | U | 5/2022 |
| CN | 115008960 | A | 9/2022 |
| CN | 217455567 | U | 9/2022 |
| JP | H078245 | Y2 * | 3/1995 |
| KR | 100868781 | B1 | 11/2008 |

OTHER PUBLICATIONS

The first Office Action of counterpart CN application No. 202210770968.7 issued on May 16, 2025.

* cited by examiner

AIR SUPPLY UNIT

CROSS-REFERENCE TO RELATED APPLICATION

The disclosure claims the priority of Chinese Patent Application No. 202210770968.7, filed in the State Intellectual Property Office of China on Jun. 30, 2022, and entitled "Air Supply Unit", the entire contents of which are herein incorporated by reference.

TECHNICAL FIELD

The disclosure relates to the technical field of air suspensions, and in particular to an air supply unit.

BACKGROUND

An air suspension controls air intake and exhaust by means of a trip computer, and thus may provide a more excellent and stable damping effect for a vehicle, such that the air suspension is applied to the damping field of vehicles more and more widely, so as to improve the comfort of the vehicles.

At present, when it is necessary to supply air to an air spring, most of the air is sucked from an external environment and is compressed into high-pressure air by a compressor, and then the high-pressure air is conveyed into the air spring. Although the function of the air spring may be realized in this way, in some harsh environments, pollutants such as impurities may easily enter the air spring, thus affecting the use of the air spring. Moreover, the integration level of the current air supply unit is relatively low, and the space utilization is unreasonable, making it quite difficult to realize the lightweight of the air spring.

Therefore, there is an urgent need to provide an air supply unit, so as to solve the problems existing in the related art to a certain extent.

SUMMARY

Some embodiments of the disclosure provide an air supply unit, so as to optimize the structure of the air supply unit at least to a certain extent, increase the air supply mode, and improve the integration level and the space utilization rate of the air supply unit.

The air supply unit provided in the disclosure includes a bearing seat, a drying mechanism, an air storage mechanism, an air supply mechanism and a control valve assembly; the air supply mechanism is connected with one end of the bearing seat, an air channel is formed in the other end of the bearing seat, and the control valve assembly is provided on one end of the bearing seat where the air channel is formed, and communicates with the air channel; and the drying mechanism provided in the bearing seat, the air storage mechanism is sleeved on one end of the bearing seat that is provided with the air supply mechanism, and the air supply mechanism is located in the air storage mechanism.

The air supply unit further includes a pressure relief valve, an accommodating cavity is formed in the bearing seat, and the drying mechanism is provided in the accommodating cavity and is connected with the pressure relief valve; and a communication air channel is formed between the drying mechanism and the pressure relief valve, and the pressure relief valve is able to open or close the communication air channel, so as to adjust an internal air pressure of the drying mechanism.

In an embodiment mode, there are a plurality of drying mechanisms and a plurality of accommodating cavities, and the number of the plurality of accommodating cavities in the bearing seat corresponds to that of the plurality of drying mechanisms; and each of the plurality of drying mechanisms includes a dryer main body, and the dryer main body is connected with the pressure relief valve.

In an embodiment mode, the air supply unit further includes an air filter, and the air filter is provided in the bearing seat and is arranged parallel to the plurality of drying mechanisms.

In an embodiment mode, the pressure relief valve includes a valve body, a cover body and a valve core assembly; the valve body is connected with the dryer main body, the cover body covers the side of the valve body that is away from the dryer main body, and form a bearing cavity with the valve body, and the communication air channel communicates with the bearing cavity; and the valve core assembly includes a valve core and an elastic member, one end of the elastic member abuts against the cover body, and the other end of the elastic member is connected with the valve core, so that the valve core is able to open or close the communication air channel.

In an embodiment mode, a stepped insertion portion is formed on one end of the dryer main body corresponding to the valve body, an insertion groove is formed in a position of the valve body corresponding to the insertion portion, therefore a tight connection between the dryer main body and the valve body is realized by means of the butt joint between the insertion portion and the insertion groove.

The air storage mechanism includes an air storage cabin and a connecting member, one end of the connecting member is connected with one end of the bearing seat, and the other end of the connecting member is connected with an open end of the air storage cabin.

In an embodiment mode, the air storage cabin is made of a metal material.

In an embodiment mode, the connecting member includes a butting member and a hooping member; and one end of the butting member is connected with the air storage cabin, the other end of the butting member is connected with the bearing seat, the hooping member is sleeved outside the butting member for hooping the butting member, so that the butting member is fixedly connected with the bearing seat.

In an embodiment mode, an annular convex portion is formed on an outer wall surface of the bearing seat and along a circumferential direction of the bearing seat, an annular groove is formed in an inner wall surface of the butting member and along a circumferential direction of the butting member, and the annular convex portion is able to be clamped into the annular groove, so that the butting member is connected with the bearing seat.

The air supply mechanism includes an air pump and a piston member; and the air pump is connected with the bearing seat, the piston member is provided in the bearing seat, one end of the air pump is provided in the bearing seat and is connected with the piston member, and the other end of the air pump is exposed from the bearing seat.

In an embodiment mode, there are two piston members, and axes of the two piston members are collinear.

In an embodiment mode, the control valve assembly includes a control valve, a control panel member and a pressure detection member; one end of the bearing seat that is away from the air storage mechanism is of a semi-cylindrical structure, one end of the control valve is provided in the bearing seat and communicate with the air channel, and the other end of the control valve is exposed from the bearing seat and is connected with the control panel member; and a communication cavity is formed in the bearing seat, the air channel communicates with the communication cavity, the pressure detection member is connected with the bearing seat, and one end of the pressure detection member is located in the bearing seat and is located in the communication cavity.

In an embodiment mode, there are a plurality of control valves, and the plurality of control valves includes a plurality of air supply control valves, a plurality of air intake control valves, and at least one exhaust valve; an air supply channel is formed in the bearing seat at a position corresponding to the air supply control valve, an air intake channel is formed at a position corresponding to the air intake control valve, and an exhaust channel is formed at a position corresponding to the exhaust valve; the air supply channel may respectively communicate with an air outlet of the air supply mechanism and the communication cavity, and penetrate through the bearing seat to form an air supply port; and the air intake channel respectively communicates with an air inlet of the air supply mechanism and the communication cavity, one end of the exhaust channel communicates with the communication cavity, and the other end of the exhaust channel penetrates through the bearing seat to communicate with the atmosphere.

Compared with the related art, the air supply unit provided in the disclosure at least has the following advantages:

The air supply unit provided in the disclosure includes a bearing seat, a drying mechanism, an air storage mechanism, an air supply mechanism and a control valve assembly; the air supply mechanism is connected with one end of the bearing seat, an air channel is formed in the other end of the bearing seat, and the control valve assembly is provided on one end of the bearing seat where the air channel is formed, and communicates with the air channel; and the drying mechanism is provided in the bearing seat, the air storage mechanism is sleeved on one end of the bearing seat that is provided with the air supply mechanism, and the air supply mechanism is located in the air storage mechanism.

It can be seen from analysis that, by means of integrating the air storage mechanism, the air supply mechanism, the drying mechanism and the control valve assembly on the bearing seat, the integration level of the air supply unit may be greatly improved, and the space of the bearing seat may be fully utilized.

Moreover, in the disclosure, since the air storage mechanism is connected with one end of the bearing seat, and the air supply mechanism is provided in the air storage mechanism, the air storage mechanism can protect the air supply mechanism to a certain extent, and may also obstruct vibration and noise generated by the air supply mechanism during operation to a certain extent.

By means of connecting the control valve assembly with the bearing seat, and correspondingly forming the air channel in the bearing seat, the air intake of the air supply mechanism and an air supply function to an air spring may be realized by means of opening and closing the air channel via the control valve assembly.

Since the drying mechanism is further integrated in the bearing seat, the air supplied into the air spring may be dried by the drying mechanism, so that air with relatively high humidity may be prevented from entering the air spring to a certain extent, resulting in a problem that condensed water deposits in the air spring to affect the use.

In addition, since the air storage mechanism is connected to the bearing seat in the disclosure, in addition to an air supply mode in the related art that external air may be sucked into the air spring, a stable clean air source may also be directly provided for the air supply mechanism by means of the air storage mechanism, thereby realizing the air supply function of the air spring, increasing the air supply mode, and making the use of the air spring be more flexible and stable.

BRIEF DESCRIPTION OF THE DRAWINGS

To illustrate technical solutions in the specific embodiments of the disclosure or in the related art more clearly, a brief introduction on the drawings which are needed in the description of the specific embodiments or the related art is given below. Apparently, the drawings in the description below are merely some embodiments of the disclosure, based on which other drawings may be obtained by those ordinary skilled in the art without any creative effort.

FIG. 1 is a schematic structural diagram of an air supply unit provided in an embodiment of the disclosure;

FIG. 2 is a cross-sectional view of an air supply unit provided in an embodiment of the disclosure;

Figure 3:
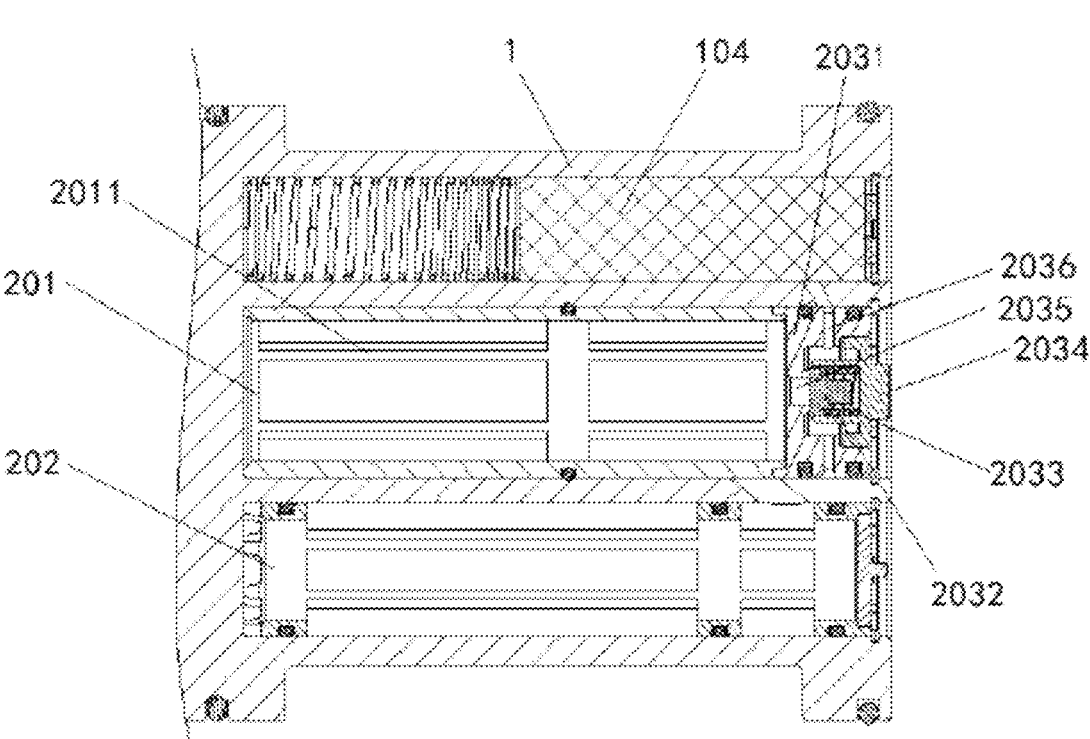
FIG. 3 is a cross-sectional view of a drying mechanism in a bearing seat in an air supply unit provided in an embodiment of the disclosure.

In the drawings: 1—bearing seat; 101—air channel; 102—air supply port; 103—annular convex portion; 104—air filter; 2—drying mechanism; 201—first drying mechanism; 202—second drying mechanism; 2011—accommodating shell; 203—pressure relief valve; 2031—valve body; 2032—valve core; 2033—elastic member; 2034—cover body; 2035—communication air channel; 2036—pressure relief channel; 3—air storage mechanism; 301—air storage cabin; 3011—drainage outlet; 302—connecting member; 3021—butting member; 3022—hooping member; 3023—annular groove; 4—air supply mechanism; 401—air pump; 402—piston member; 5—control valve; 501—mechanical section; 502—electrical section; 6—PCB; 7—control panel; 8—pressure detection member; 9—protection cover.

DETAILED DESCRIPTION OF THE EMBODIMENTS

In order to make the objectives, technical solutions and advantages of the embodiments of the disclosure clearer, a clear and complete description of technical solutions in the embodiments of the disclosure will be given below, in combination with the drawings in the embodiments of the disclosure. Apparently, the embodiments described below are merely a part, but not all, of the embodiments of the disclosure. In general, assemblies of the embodiments of the disclosure, typically described and shown in the drawings, may be arranged and designed in various different configurations. Therefore, the detailed description of the embodiments of the disclosure provided in the drawings below is not intended to limit the claimed protection scope of the disclosure, but only to represent selected embodiments of the disclosure. All of other embodiments, obtained by those ordinary skilled in the art based on the embodiments of the disclosure without any creative effort, fall into the protection scope of the disclosure.

In the description of the embodiments of the disclosure, it should be noted that orientation or position relationships indicated by terms "upper", "lower", "left", "right", "vertical", "horizontal", "inside", "outside" and the like are generally orientation or position relationships shown on the basis of the drawings, or are orientation or position relationships where the product of the present invention is generally placed in use, and are merely for the convenience of describing the disclosure and simplifying the description, but do not indicate or imply that the referred apparatuses or elements must have specific orientations or must be constructed and operated in specific orientations, and thus cannot be construed as limitations to the disclosure. In addition, the terms "first", "second", "third" and the like are only configured for distinguishing the descriptions, but cannot be understood as indicating or implying relative importance.

In addition, the terms "horizontal", "vertical" and the like do not indicate that a component must be absolutely horizontal or vertical, but may be slightly inclined. For example, "horizontal" merely indicates that its direction is more horizontal with respect to "vertical", but does not represent that the structure must be completely horizontal, but may be slightly inclined.

In the description of the embodiments of the disclosure, it should be noted that the terms "disposition", "installation", "communication" and "connection" should be understood in a broad sense, unless otherwise expressly specified and limited. For example, the connection may be a fixed connection, and may also be a detachable connection, or an integral connection; may be a mechanical connection, and may also be an electrical connection; and may be a direct connection, may be an indirect connection through an intermediate medium, and may also be internal communication between two elements. For those ordinary skilled in the art, the specific meanings of the above terms in the disclosure may be understood in specific situations.

As used herein, the term "and/or" includes any one and any combination of any two or more of the listed related items.

For ease of description, spatial relationship terms such as "above", "upper portion", "below" and "lower portion" may be used therein to describe the relationship between one element and another element as shown in the drawings. Such spatial relationship terms are intended to further include different orientations of the apparatus in use or operation in addition to the orientations depicted in the drawings.

The terms used herein are for the purpose of describing various examples only and are not intended to limit the present disclosure. Singular forms are intended to include plural forms as well, unless the context clearly indicates otherwise. The terms "include", "contain" and "have" recite stated features, quantities, operations, members, elements, and/or combinations thereof, but do not preclude the presence or addition of one or more other features, quantities, operations, members, elements, and/or combinations thereof.

Changes in the shapes shown in the drawings may occur due to manufacturing techniques and/or tolerances. Accordingly, the examples described herein are not limited to the particular shapes shown in the drawings, but include changes in shapes that occur during manufacturing.

The features of the examples described herein may be combined in various ways that will be apparent upon understanding the disclosure of the disclosure. In addition, although the examples described herein have a wide variety of configurations, other configurations are possible, as will be apparent upon understanding the disclosure of the disclosure. In addition, the technical solutions between the various embodiments may be combined with each other, but must be based on the realizability of those of ordinary skilled in the art, and when the combination of the technical solutions is contradictory or cannot be implemented, it should be considered that the combination of the technical solutions does not exist, nor is within the protection scope of the disclosure.

Figures 1, 2:
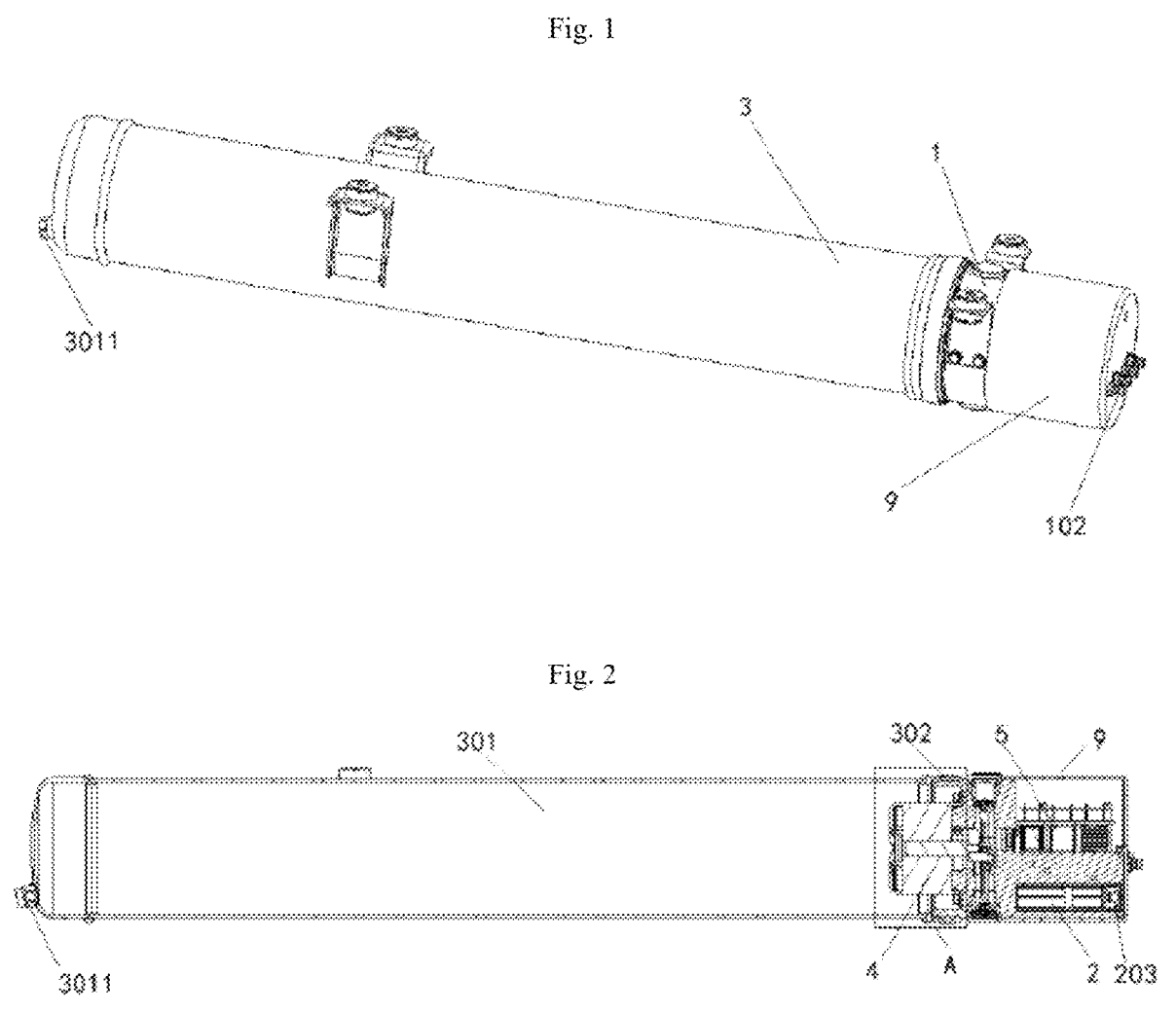

As shown in FIG. 1 to FIG. 6, the disclosure provides an air supply unit, including a bearing seat 1, a drying mechanism 2, an air storage mechanism 3, an air supply mechanism 4 and a control valve assembly, wherein the air supply mechanism 4 is connected with one end of the bearing seat 1, an air channel 101 is formed in the other end of the bearing seat 1, and the control valve assembly is provided on one end of the bearing seat 1 where the air channel 101 is formed, and communicates with the air channel 101; and the drying mechanism 2 is provided in the bearing seat 1, the air storage mechanism 3 is sleeved on one end of the bearing seat 1 that is provided with the air supply mechanism 4, and the air supply mechanism 4 is located in the air storage mechanism 3.

Compared with the related art, the air supply unit provided in the disclosure has the following advantages:

In the air supply unit provided in the disclosure, by means of integrating the air storage mechanism 3, the air supply mechanism 4, the drying mechanism 2 and the control valve assembly on the bearing seat 1, the integration level of the air supply unit may be greatly improved, and the space of the bearing seat 1 may be fully utilized.

Moreover, in the disclosure, since the air storage mechanism 3 is connected with one end of the bearing seat 1, and the air supply mechanism 4 is provided in the air storage mechanism 3, the air storage mechanism 3 can protect the air supply mechanism 4 to a certain extent, and may also obstruct vibration and noise generated by the air supply mechanism 4 during operation to a certain extent.

By means of connecting the control valve assembly with the bearing seat 1, and correspondingly forming the air channel 101 in the bearing seat 1, the air intake of the air supply mechanism 4 and an air supply function to an air spring may be realized by means of opening and closing the air channel 101 via the control valve assembly.

Since the drying mechanism 2 is further integrated in the bearing seat 1 in the disclosure, the air supplied into the air spring may be dried by the drying mechanism 2, so that air with relatively high humidity may be prevented from entering the air spring to a certain extent, resulting in a problem that condensed water deposits in the air spring to affect the use.

In addition, since the air storage mechanism 3 is connected to the bearing seat 1 in the disclosure, in addition to an air supply mode in the related art that external air may be sucked into the air spring, a stable clean air source may also be directly provided for the air supply mechanism 4 by means of the air storage mechanism 3, thereby realizing the air supply function of the air spring, increasing the air supply mode, and making the use of the air spring be more flexible and stable.

Based on the above structures, as shown in FIG. 2 in combination with FIG. 3, there are a plurality of drying mechanisms 2 in the disclosure, and preferably, the plurality of drying mechanisms 2 in the disclosure include a first drying mechanism 201 and a second drying mechanism 202, a first accommodating cavity and a second accommodating cavity are formed in the bearing seat 1, the first drying mechanism 201 is provided in the first accommodating cavity, the second drying mechanism 202 is provided in the second accommodating cavity, and the first accommodating cavity communicates with the second accommodating cavity.

By means of communicating the first accommodating cavity with the second accommodating cavity, the first drying mechanism 201 installed in the first accommodating cavity can communicate with the second drying mechanism 202 installed in the second accommodating cavity, so that the drying capability and the drying efficiency of the entire air supply unit for the air may be improved.

It should be additionally noted here that, as shown in FIG. 3, in the disclosure, each of the first drying mechanism 201 and the second drying mechanism 202 includes a dryer main body, the dryer main body in the disclosure includes a hollow accommodating shell 2011 and a drying agent filled in the accommodating shell 2011, and the hollow accommodating shell 2011 can not only reduce the weight of the dryer main body, but may also improve the air permeability of the dryer main body. In the disclosure, the drying agent is granular, and correspondingly, in order to ensure that the drying agent may be stably stored in the accommodating shell 2011, a nylon net is sleeved outside the accommodating shell 2011 in the disclosure, and the size of the mesh hole is less than the diameter of the drying agent, so that the problem of the dryer moving around may be avoided to a certain extent.

It should be additionally noted here that, forming two accommodating cavity and disposing two drying mechanisms 2 in the bearing seat 1 are merely one embodiment, as shown in FIG. 2, there may also be one drying mechanism 2 in the disclosure, and when the inner space condition of the bearing seat 1 is met and there is a corresponding demand, the number of the plurality of drying mechanisms 2 is appropriately increased according to the demand.

In an embodiment mode, as shown in FIG. 2 in combination with FIG. 3, in the disclosure, each of the first drying mechanism 201 and the second drying mechanism 202 includes a dryer main body; an accommodating cavity is formed in the bearing seat 1, the dryer main body and a pressure relief valve 203 are both provided in the accommodating cavity, a communication air channel 2035 is formed between the dryer main body and the pressure relief valve 203, and the pressure relief valve 203 is able to open or close the communication air channel 2035.

In the disclosure, the pressure relief valve 203 is connected with the dryer main body, therefore, on one hand, the space utilization rate of the overall structure may be improved, and on the other hand, the stability of the dryer main body during operation may be improved. When the air pressure carried in the dryer main body is too high, the pressure relief valve 203 is able to open the communication air channel 2035, so that a part of air in the dryer main body may be exhausted, thereby ensuring the stability of the air pressure in the dryer main body to a certain extent.

It can be understood that, since the first accommodating cavity and the second accommodating cavity in the disclosure communicate with each other, the pressure relief valve 203 in the disclosure is able to be integrally connected with any drying mechanism 2, and the first drying mechanism 201 and the second drying mechanism 201 are able to also be respectively connected with one pressure relief valve 203 to realize a pressure relief protection function.

In an embodiment mode, as shown in FIG. 3, the pressure relief valve 203 provided in the disclosure includes a valve body 2031, a cover body 2034 and a valve core assembly;

the valve body 2031 is connected with the dryer main body, the cover body 2034 covers one side of the valve body 2031 that is away from the dryer main body, and forms a bearing cavity with the valve body 2031, and the communication air channel 2035 communicates with the bearing cavity; and the valve core assembly includes a valve core 2032 and an elastic member 2033, one end of the elastic member 2033 abuts against the cover body 2034, and the other end of the elastic member is connected with the valve core 2032, so that the valve core 2032 is able to open or close the communication air channel 2035.

In order to ensure that the connection between the valve body 2031 and the dryer main body is tighter, in the disclosure, a stepped insertion portion is formed on one end of the dryer main body corresponding to the valve body 2031, an insertion groove is formed in a position of the valve body 2031 corresponding to the insertion portion, therefore a tight connection between the dryer main body and the valve body 2031 may be realized by means of the butt joint between the insertion portion and the insertion groove.

The communication air channel 2035 is formed on the valve body 2031, the valve body 2031 and the cover body 2034 form the bearing cavity, one end of the communication air channel 2035 communicates with the bearing cavity, and the other end thereof communicates with the accommodating cavity. Since the valve core assembly in the disclosure includes the valve core 2032 and the elastic member 2033, when the air pressure in the drying mechanism 2 is too high, the air enters the bearing cavity from the communication air channel 2035 and pushes the valve body 2031 to move towards a direction away from the communication air channel 2035, so as to compress the elastic member 2033, so that the communication air channel 2035 is opened. In the disclosure, a pressure relief channel 2036 is further formed between the valve body 2031 and the cover body 2034, and the air enters the bearing cavity from the communication air channel 2035 and is exhausted from the pressure relief channel 2036, so that the air pressure in the drying mechanism 2 may be kept stable.

After the pressure relief is completed, the valve core 2032 loses the thrust of the air, and the compressed elastic member 2033 returns to the initial state, so as to push the valve core 2032 to move towards a direction close to the communication air channel 2035, until the communication air channel 2035 is closed, and then one pressure relief operation is completed.

It should be additionally noted here that in the disclosure, a third accommodating cavity is further formed in the bearing seat 1, an air filter 104 is provided in the third accommodating cavity, and preferably, in the disclosure, the air filter 104 is arranged parallel to the first drying mechanism 201 and the second drying mechanism 202. When the air pressure in the dryer mechanism is too high for performing pressure relief via the pressure relief valve 203, the air exhausted from the pressure relief channel 2036 is discharged to the atmosphere via the air filter 104.

It should be additionally noted here that, in order to ensure the sealing degree among the dryer main body, the pressure relief valve 203 and the bearing seat 1, as shown in FIG. 3, in the disclosure, sealing rings are sleeved on an outer wall surface of the accommodating shell 2011, an outer wall surface of the valve body 2031 and an outer wall surface of the cover body 2034, so that the sealing effect between the drying mechanism 2 and the bearing seat 1 may be ensured to a certain extent.

Figure 4:
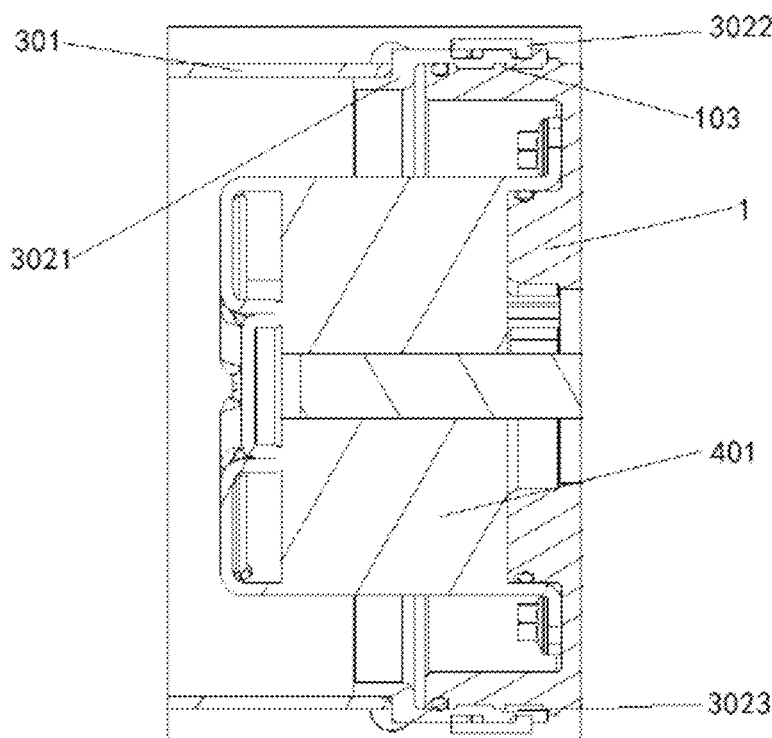
FIG. 4 is a partial enlarged view of A in FIG. 2.

In an embodiment mode, as shown in FIG. 1 in combination with FIG. 4, the air storage mechanism 3 in the disclosure includes an air storage cabin 301 and a connecting member 302, one end of the connecting member 302 is connected with one end of the bearing seat 1, and the other end of the connecting member 302 is connected with an open end of the air storage cabin 301.

The air storage cabin 301 in the disclosure is configured for storing the air and is connected with the bearing seat 1 by means of the connecting member 302, so that a stable and clean air source may be provided for the air spring. Since the humidity of the air entering the air storage cabin 301 is different due to external environment factors, when the air humidity is large, condensed water is easily generated in the air storage cabin 301, thereby affecting the capacity of the air storage cabin 301 and affecting the air conveying capacity of the air spring. Moreover, after the air supply unit is combined with the air spring, the air supply unit extends in the vertical direction, therefore, in the disclosure, a drainage outlet 3011 is formed in one end of the air storage cabin 301 that is away from the bearing seat 1, that is, the drainage outlet 3011 is formed in a bottom end of the air supply unit in an actual installation state, and when water is accumulated in the air storage cabin 301, the accumulated water may be directly discharged from the drainage outlet 3011, thereby ensuring the operation stability of the air spring to a certain extent.

Moreover, since the air supply mechanism 4 in the disclosure is located in the air storage cabin 301, the air storage cabin 301 can not only protect the air supply mechanism 4, so as to avoid impurities such as dust entering the air supply mechanism 4, but may also obstruct vibration and noise generated by the air supply mechanism 4 during operation to a certain extent.

In an embodiment mode, the air storage cabin 301 in the disclosure is made of a metal material, so that the heat dissipation efficiency of the air supply mechanism 4 is also improved to a certain extent by means of the air storage cabin 301, thereby ensuring the operation stability of the overall mechanism.

In an embodiment mode, as shown in FIG. 4, the connecting member 302 in the disclosure includes a butting member 3021 and a hooping member 3022; one end of the butting member 3021 is connected with the air storage cabin 301, and the other end thereof is connected with the bearing seat 1; and the hooping member 3022 is sleeved outside the butting member 3021 for hooping the butting member 3021, so that the butting member 3021 is fixedly connected with the bearing seat 1.

During installation, one end of the air storage cabin 301 is welded with one end of the butting member 3021 at first, then the hooping member 3022 is sleeved outside the abutting member 3021, and the other end of the abutting member 3021 is butted with an end portion of the bearing seat 1. Finally, the hooping member 3022 is folded, so that the butting member 3021 and the bearing seat 1 are hooped, thereby realizing a stable connection between the air storage cabin 301 and the bearing seat 1.

In an embodiment mode, as shown in FIG. 4, in the disclosure, an annular convex portion 103 is formed on the outer wall surface of the bearing seat 1 and along a circumferential direction of the bearing seat 1, an annular groove 3023 is formed in an inner wall surface of the butting member 3021 and along a circumferential direction of the butting member 3021, and the annular convex portion 103 is able to be clamped into the annular groove 3023, so that the butting member 3021 is connected with the bearing seat 1.

By means of the annular convex portion 103 formed on the outer wall surface of the bearing seat 1 and the annular groove 3023 formed in the inner wall surface of the butting member 3021, positioning and connecting effects may be realized during a preliminary connection process of the butting member 3021 and the bearing seat 1, that is, after the annular convex part 103 is clamped into the annular groove 3023, the bearing seat 1 and the butting member 3021 may be positioned in the axial direction, so that the butting member 3021 and the bearing seat 1 may be stably connected, and thus the hooping member 3022 may be conveniently operated to be folded.

Figure 5:
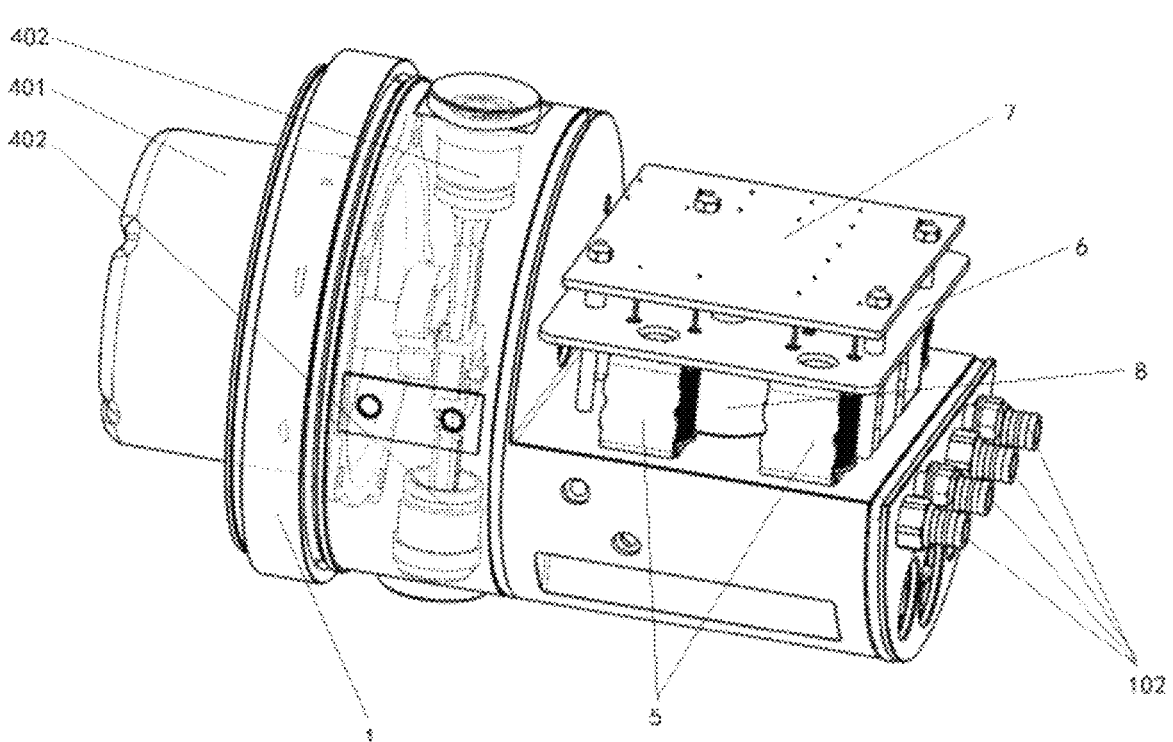
FIG. 5 is a schematic structural diagram of an air supply mechanism and a control valve assembly in an air supply unit provided in an embodiment of the disclosure.

As shown in FIG. 5, the air supply mechanism 4 in the disclosure includes an air pump 401 and a piston member 402; and the air pump 401 is connected with the bearing seat 1, the piston member 402 is provided in the bearing seat 1, one end of the air pump 401 is provided in the bearing seat 1 and is connected with the piston member 402, and the other end of the air pump 401 is exposed from the bearing seat 1.

In the disclosure, the air supply mechanism 4 is integrated on the bearing seat 1, so that the integration level and the space utilization rate of the entire unit may be improved; and during operation, the air enters the air pump 401, the air is compressed into high-pressure air by the piston component 402 to enter the air channel 101, and the air enters the air spring from an air supply port 102.

There is at least one piston member 402 in the disclosure; and as shown in FIG. 5, in an embodiment mode, there are two piston members 402 in the disclosure, and axes of the two piston members 402 are collinear, so that the efficiency of air compression may be maximally improved in a limited space.

Figure 6:
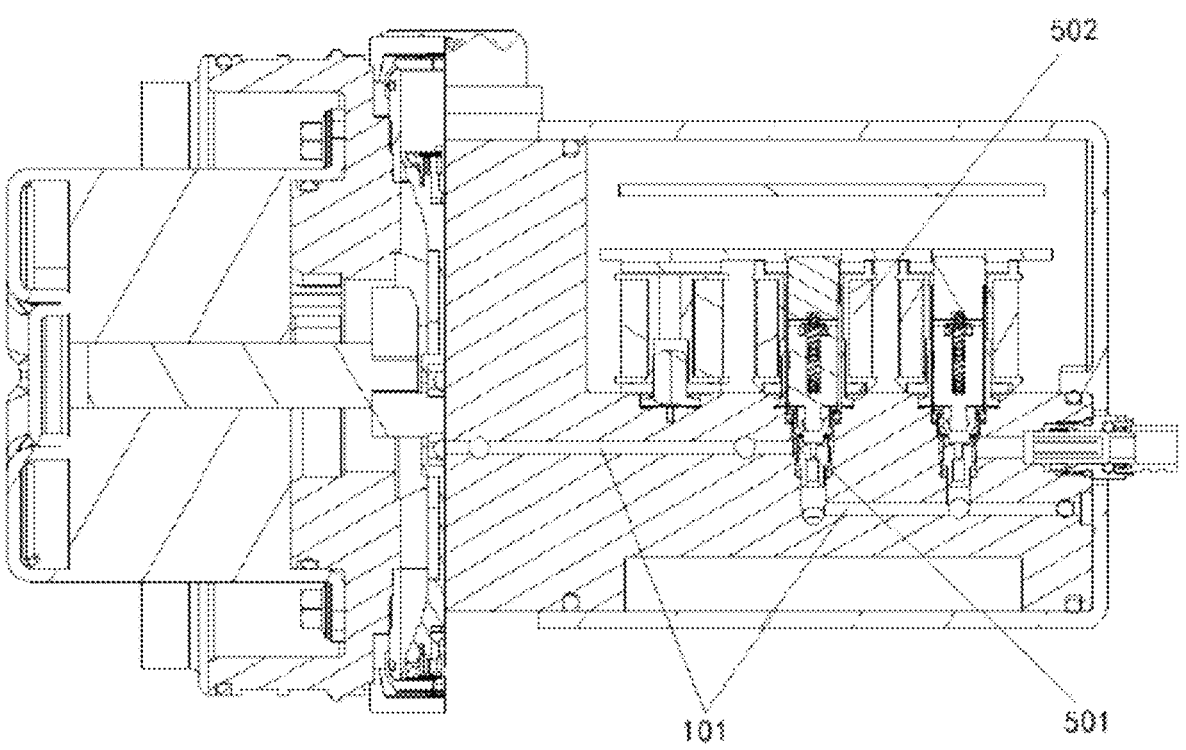
FIG. 6 is a cross-sectional view of a control valve assembly and a bearing seat in an air supply unit provided in an embodiment of the disclosure.

In an embodiment mode, as shown in FIG. 5 in combination with FIG. 6, the control valve assembly in the disclosure includes a control valve 5, a control panel member and a pressure detection member 8; one end of the control valve 5 is provided in the bearing seat 1 and communicates with the air channel 101, and the other end of the control valve 5 is exposed from the bearing seat 1 and is connected with the control panel member; and a communication cavity is formed in the bearing seat 1, the air channel 101 communicates with the communication cavity, the pressure detection member 8 is connected with the bearing seat 1, and one end of the pressure detection member 8 is located in the bearing seat 1 and is located in the communication cavity.

The control panel member in the disclosure includes a PCB 6 and a control panel 7, a mechanical section 501 of the control valve 5 is provided in the bearing seat 1 and communicates with the air channel 101, and an electrical section 502 is exposed from the bearing seat 1 and is connected with the PCB 6. The PCB 6 in the disclosure is configured for a circuit connection between the control panel 7 and the control valve 5, and the control panel 7 drives the control valve 5 to close or open the air channel 101.

In an embodiment mode, in the disclosure, the axis of the control valve 5 is perpendicular to the axis of the air pump 401, that is, the air pump 401 and the control valve 5 are disposed to form 90°, so that the space of the bearing seat 1 may be fully utilized, and the spatial distribution is more reasonable.

In an embodiment mode, in the disclosure, a communication cavity is formed in the bearing seat 1, an air outlet and an air inlet of the air supply mechanism 4 both communicate with the communication cavity, and an air supply channel for conveying the air to the air spring also communicates with the communication cavity, that is, the communication cavity in the disclosure is an intermediate station of the air channel 101, the air entering the bearing seat 1 needs to enter the communication cavity, and then flows to the corresponding air channel 101 to realize different functions. Therefore, the pressure detection member 8 is further integrated in the bearing seat 1 in the disclosure, and the pressure in the communication cavity may be detected by the pressure detection member 8, so that an adjustment may be made according to the specific pressure conditions, so as to ensure the operation safety and stability of the entire apparatus.

In an embodiment mode, there are a plurality of control valves 5 in the disclosure, and the plurality of control valves 5 include a plurality of air supply control valves, a plurality of air intake control valves, and at least one exhaust valve; an air supply channel is formed in the bearing seat 1 at a position corresponding to the air supply control valve, an air intake channel is formed at a position corresponding to the air intake control valve, and an exhaust channel is formed at a position corresponding to the exhaust valve; the air supply channel respectively communicates with the air outlet of the air supply mechanism 4 and the communication cavity, and penetrates through the bearing seat 1 to form the air supply port 102; and the air intake channel respectively communicates with the air inlet of the air supply mechanism 4 and the communication cavity, one end of the exhaust channel communicates with the communication cavity, and the other end of the exhaust channel penetrates through the bearing seat 1 to communicate with the atmosphere.

There are 9 control valves 5 in the disclosure, including one exhaust valve, four air supply control valves and four air intake control valves, wherein the four air supply control valves are configured for supplying air to the air spring, therefore, four air supply channels are correspondingly formed in the bearing seat 1 in the disclosure, one end of the air supply channel communicates with the air supply control valve, one end communicates with the communication cavity, and one end communicates with the air supply port 102. Moreover, in the disclosure, the air supply channel further communicates with the air outlet of the air supply mechanism 4, therefore when the air is supplied to the air spring, the air supply channel is firstly opened by the air supply control valve, and then compressed air compressed by the air supply mechanism 4 flows through the air supply channel to enter the air spring by means of the air supply port 102, and thus the air supply operation of the air spring is completed.

Correspondingly, one end of the air intake channel in the disclosure communicates with the air inlet of the air supply mechanism 4, and the other end of the air intake channel communicates with the air intake control valve after passing through the communication cavity, so that the on-off of different air intake channels may be controlled by the air intake control valve, and then different air supply modes may be selected.

It can be understood that in the disclosure, the exhaust channel communicates with the communication cavity, therefore when the air pressure in the communication cavity is too high, the exhaust valve is controlled to open the exhaust channel, so as to exhaust the air, thereby ensuring the stability of the pressure in the entire air channel 101.

It should be additionally noted here that, the number of the control valves 5 in the disclosure is only one of the embodiments, and other numbers of control valves may also be used to implement the functions provided in the disclosure.

It should be additionally noted here that, the air supply unit provided in the disclosure further includes a protection cover 9, and the protection cover 9 covers one end of the bearing seat 1 that is away from the air storage cabin 301, and can form, together with the bearing seat 1, a protection cavity for accommodating the plurality of control valves 5, the PCB 6, the control panel 7 and the pressure detection member 8, so that the service life and the use stability of the control valve assembly may be improved to a certain extent.

Correspondingly, as shown in FIG. 1, the air supply port 102 is formed in the protection cover 9 in the disclosure at a position corresponding to the air supply channel of the bearing seat 1, so that air supply to the air spring may be realized.

The foregoing description is merely a preferred embodiment of the disclosure, and is not intended to limit the disclosure, and any modifications, equivalent replacements, improvements and the like, made within the spirit and principles of the disclosure, shall fall within the protection scope of the disclosure.

INDUSTRIAL APPLICABILITY

According to an air supply unit provided in the disclosure, the structure of the air supply unit is optimized to a certain extent, the air supply mode is increased, and the integration level and the space utilization rate of the air supply unit are improved. The air supply unit provided in the disclosure includes a bearing seat, a drying mechanism, an air storage mechanism, an air supply mechanism and a control valve assembly; the air supply mechanism is connected with one end of the bearing seat, an air channel is formed in the other end of the bearing seat, and the control valve assembly is provided on one end of the bearing seat where the air channel is formed, and communicates with the air channel; and the drying mechanism is provided in the bearing seat, the air storage mechanism is sleeved on one end of the bearing seat that is provided with the air supply mechanism, and the air supply mechanism is located in the air storage mechanism.

In addition, it can be understood that the air supply unit provided in the disclosure is reproducible and may be applied to a variety of industrial applications. For example, the air supply unit provided in the disclosure may be applied to the technical field of air suspensions.

What is claimed is:

1. An air supply unit, comprising a bearing seat, a drying mechanism, an air storage mechanism, an air supply mechanism and a control valve assembly;

the air supply mechanism is connected with one end of the bearing seat, an air channel is formed in the other end of the bearing seat, and the control valve assembly is provided on one end of the bearing seat where the air channel is formed, and communicates with the air channel; and the drying mechanism is provided in the bearing seat, the air storage mechanism is sleeved on one end of the bearing seat that is provided with the air supply mechanism, and the air supply mechanism is located in the air storage mechanism;

wherein the air supply mechanism comprises an air pump and a piston member; and the air pump is connected with the bearing seat, the piston member is provided in the bearing seat, one end of the air pump is provided in the bearing seat and is connected with the piston member, and the other end of the air pump is exposed from the bearing seat.

2. The air supply unit according to claim 1, the air supply unit further comprises a pressure relief valve, wherein an accommodating cavity is formed in the bearing seat, and the drying mechanism is provided in the accommodating cavity and is connected with the pressure relief valve; and a communication air channel is formed between the drying mechanism and the pressure relief valve, and the pressure relief valve is able to open or close the communication air channel, so as to adjust an internal air pressure of the drying mechanism.

3. The air supply unit according to claim 2, wherein there are a plurality of drying mechanisms and a plurality of accommodating cavities, and the number of the plurality of accommodating cavities in the bearing seat corresponds to that of the plurality of drying mechanisms; and each of the plurality of drying mechanisms comprises a dryer main body, and the dryer main body is connected with the pressure relief valve.

4. The air supply unit according to claim 3, the air supply unit further comprises an air filter, wherein the air filter is provided in the bearing seat and is arranged parallel to the plurality of drying mechanisms.

5. The air supply unit according to claim 3, wherein the pressure relief valve comprises a valve body, a cover body and a valve core assembly;

the valve body is connected with the dryer main body, the cover body covers one side of the valve body that is away from the dryer main body, and forms a bearing cavity with the valve body, and the communication air channel communicates with the bearing cavity; and the valve core assembly comprises a valve core and an elastic member, one end of the elastic member abuts against the cover body, and the other end of the elastic member is connected with the valve core, so that the valve core is able to open or close the communication air channel.

6. The air supply unit according to claim 5, wherein a stepped insertion portion is formed on one end of the dryer main body corresponding to the valve body, an insertion groove is formed in a position of the valve body corresponding to the insertion portion, therefore a tight connection between the dryer main body and the valve body is realized by means of the butt joint between the insertion portion and the insertion groove.

7. The air supply unit according to claim 1, wherein the air storage mechanism comprises an air storage cabin and a connecting member, one end of the connecting member is connected with one end of the bearing seat, and the other end of the connecting member is connected with an open end of the air storage cabin.

8. The air supply unit according to claim 7, wherein the air storage cabin is made of a metal material.

9. The air supply unit according to claim 7, wherein the connecting member comprises a butting member and a hooping member; and one end of the butting member is connected with the air storage cabin, the other end of the butting member is connected with the bearing seat, the hooping member is sleeved outside the butting member for hooping the butting member, so that the butting member is fixedly connected with the bearing seat.

10. The air supply unit according to claim 9, wherein an annular convex portion is formed on an outer wall surface of the bearing seat and along a circumferential direction of the bearing seat, an annular groove is formed in an inner wall surface of the butting member and along a circumferential direction of the butting member, and the annular convex portion is able to be clamped into the annular groove.

11. The air supply unit according to claim 1, wherein there are two piston members, and axes of the two piston members are collinear.

12. The air supply unit according to claim 1, wherein the control valve assembly comprise a control valve, a control panel member and a pressure detection member;

one end of the bearing seat that is away from the air storage mechanism is of a semi-cylindrical structure, one end of the control valve is provided in the bearing seat and communicates with the air channel, and the other end of the control valve is exposed from the bearing seat and is connected with the control panel member; and a communication cavity is formed in the bearing seat, the air channel communicates with the communication cavity, the pressure detection member is connected with the bearing seat, and one end of the pressure detection member is located in the bearing seat and is located in the communication cavity.

13. The air supply unit according to claim 12, wherein there are a plurality of control valves, and the plurality of control valves comprise a plurality of air supply control valves, a plurality of air intake control valves, and at least one exhaust valve;

an air supply channel is formed in the bearing seat at a position corresponding to the air supply control valve, an air intake channel is formed at a position corresponding to the air intake control valve, and an exhaust channel is formed at a position corresponding to the exhaust valve;

the air supply channel respectively communicates with an air outlet of the air supply mechanism and the communication cavity, and penetrates through the bearing seat to form an air supply port; and the air intake channel respectively communicates with an air inlet of the air supply mechanism and the communication cavity, one end of the exhaust channel communicates with the communication cavity, and the other end of the exhaust channel penetrates through the bearing seat to communicate with the atmosphere.

14. The air supply unit according to claim 12, the air supply unit further comprises a pressure relief valve, wherein an accommodating cavity is formed in the bearing seat, and the drying mechanism is provided in the accommodating cavity and is connected with the pressure relief valve; and a communication air channel is formed between the drying mechanism and the pressure relief valve, and the pressure relief valve is able to open or close the communication air channel, so as to adjust an internal air pressure of the drying mechanism.

15. The air supply unit according to claim 14, wherein there are a plurality of drying mechanisms and a plurality of accommodating cavities, and the number of the plurality of accommodating cavities in the bearing seat corresponds to that of the plurality of drying mechanisms; and each of the plurality of drying mechanisms comprises a dryer main body, and the dryer main body is connected with the pressure relief valve.

16. The air supply unit according to claim 15, the air supply unit further comprises an air filter, wherein the air filter is provided in the bearing seat and is arranged parallel to the plurality of drying mechanisms.

17. The air supply unit according to claim 15, wherein the pressure relief valve comprises a valve body, a cover body and a valve core assembly;

the valve body is connected with the dryer main body, the cover body covers one side of the valve body that is away from the dryer main body, and forms a bearing cavity with the valve body, and the communication air channel communicates with the bearing cavity; and the valve core assembly comprises a valve core and an elastic member, one end of the elastic member abuts against the cover body, and the other end of the elastic member is connected with the valve core, so that the valve core is able to open or close the communication air channel.

18. The air supply unit according to claim 17, wherein a stepped insertion portion is formed on one end of the dryer main body corresponding to the valve body, an insertion groove is formed in a position of the valve body corresponding to the insertion portion, therefore a tight connection between the dryer main body and the valve body is realized by means of the butt joint between the insertion portion and the insertion groove.

19. The air supply unit according to claim 12, wherein the air storage mechanism comprises an air storage cabin and a connecting member, one end of the connecting member is connected with one end of the bearing seat, and the other end of the connecting member is connected with an open end of the air storage cabin.

* * * * *